Patented Apr. 20, 1937

2,077,795

UNITED STATES PATENT OFFICE 2,077,795

REFRACTORIES

Frederic A. Harvey and Raymond E. Birch, Pittsburgh, Pa., assignors to Harbison-Walker Refractories Company, Pittsburgh, Pa., a corporation of Pennsylvania No Drawing. Application June 13, 1935, Serial No. 26,520

15 Claims. (Cl. 106—9)

This invention relates to refractories of improved character, especially magnesia-containing refractories.

It has been proposed heretofore to make refractories from refractory magnesium orthosilicate materials, such as olivine, by mixing them with substances rich in magnesia, such as burned magnesite, in amounts adapted to convert siliceous impurities, free silica, magnesium hydrosilicates, and the like substances of relatively low refractory value, to magnesium orthosilicate ($2 MgO.SiO_2$), and to convert iron, when present in substantial amounts, to magnesium ferrite ($MgO.Fe_2O_3$). Those proposals have contemplated the use of rather pure magnesia-rich materials, for instance burned magnesite consisting essentially of about 92 per cent of MgO, 2 per cent of iron calculated as FeO, 1 per cent of $SiO_2$, and 5 per cent ignition loss, apparently on the theory that impure materials would reduce the refractory value of the product.

We have found that certain disadvantages attend the use of such high purity magnesia-rich materials in the production of such refractories. One of the most serious of these is that the brick after firing possess quite unsatisfactory mechanical properties. For instance, as the brick come from the kiln they are friable and their corners and edges are easily scuffed; because of this the brick must be handled quite carefully and they are damaged easily in shipment. Moreover, the firing temperatures necessary are generally so high as to be difficult to obtain practically and commercially.

It is among the objects of this invention to provide refractories of the foregoing type in which the aforementioned disadvantages are avoided or minimized, and which have improved strength characteristics.

The invention is predicated on our discovery that, contrary to what would have been expected, refractories made from forsterite materials are substantially improved in character by using, instead of the high purity magnesia-rich materials heretofore suggested, substances rich in magnesia and of relatively high-lime content. The term "high-lime content" as used herein has reference to magnesia-rich materials which after dissipation of volatile constituents, when present, through calcination contain in excess of about 3 per cent of lime (CaO). The high-lime material is added in an amount such as to provide a substantial lime content in the refractory. Some forsterite materials, such as olivine, contain small amounts of lime; we contemplate refractories containing lime well in excess of that resulting from that contained in the olivine.

In the preferred practice of the invention there are used lime-containing magnesites. As illustrative of materials suitable for the purposes of the invention, magnesites (dead-burned) of the following compositions have been found to be satisfactory:

|  | Magnesite | |
| --- | --- | --- |
|  | "A" | "B" |
|  | Percent | Percent |
| MgO | 80.8 | 57.6 |
| CaO | 5.8 | 25.0 |
| $SiO_2$ | 6.7 | 7.8 |
| $R_2O_3$ | 6.5 | 9.1 |
| Ignition loss | 0.2 | 0.5 |

Magnesite "A" is a true magnesite of high-lime content. The lime content of magnesite "B" is unusually high for a magnesite, probably owing to the presence of a proportion of dolomite or calcite, or both.

While reference has been made to the use of high-lime magnesites as exemplifying materials suitable for the practice of the invention, other magnesia-rich materials may be used provided they contain a sufficiently high-lime content, as just indicated. For instance, there may be used high-lime brucites, electrically fused magnesia, and other magnesia-rich materials known to those skilled in the art. While it is preferred to use magnesite in dead-burned condition, this is not essential in all cases, for caustic burned material may be used, although it is less suitable than dead-burned magnesite because it tends to undesirably increase the firing shrinkage.

Materials containing less than about 3 per cent of lime are, in general, not suited for the purposes of the invention, and those containing more than about 30 per cent of lime, i. e., materials of the dolomite class, tend to introduce unfavorable factors. For most purposes, therefore, it is preferred to use magnesia-rich materials containing between about 3 to about 30 per cent of lime.

The base of the refractories provided by this invention is forsterite material, and we prefer to use natural olivine minerals, which are rich in forsterite, such as peridotite or dunite. However, synthetic products consisting wholly or largely of magnesium orthosilicate may likewise be used. The minerals referred to are orthosilicates of the magnesium-iron type containing, preferably, not to exceed about 15 per cent of iron calculated as FeO, and with the iron advantageously less than about 10 per cent. An olivine typical of those suitable for the practice of the invention contains about 49 per cent of MgO, 7 per cent of FeO, 42 per cent of $SiO_2$, and minor amounts of customary impurities. In such an olivine the lime content usually will not exceed a few tenths of 1 per cent.

The olivines may contain considerable amounts of alteration products in the form of hydrous magnesium silicates, for example as talc and serpentine, and in some instances they may contain appreciable amounts of less refractory compounds such as pyroxenes. These non-forsteritic materials are converted by the added magnesia-rich material to compounds of high refractoriness, such as forsterite and magnesium ferrite, thus conferring exceptionally high refractory value to the final product.

Thus the invention resides in the production of refractories from forsterite materials and magnesia-rich materials containing lime in amounts such that the latter have previously been considered not suitable for making magnesium silicate refractories, to provide advantages over similar refractories made from magnesia-rich materials of greater purity and low in lime. In particular, the refractories made in accordance with this invention possess materially greater strength and exceptional stability. In the practice of the invention olivine constitutes the preferred base of the refractory, and therefore it may be referred to hereinafter as exemplifying the practice of the invention, but without limiting it thereto. Olivine, as noted hereinabove, treated in accordance with the invention, produces what is essentially a forsterite refractory, although, as will appear presently, other refractory materials may be present provided the olivine (or forsterite material) constitutes the major portion of the refractory batch.

In the practice of the invention there is added to a suitable olivine an amount of magnesia-rich, high-lime material sufficient to provide at least about 0.8 per cent and not more than about 6 per cent of lime in the product. Substantial benefits do not accrue, as we now believe, below about 0.8 per cent of lime, and above about 6 per cent of lime the refractoriness may be reduced materially and excessive shrinkage at high temperatures may be encountered. Between the limits stated we have found that, more or less irrespective of the source of the magnesia-rich material, the strength of the fired product is in general proportional to the lime content of the brick.

It is preferred in the manufacture of the refractories to use the olivine in the form of relatively coarse granules, and to have the magnesia-rich material in finely divided form. By way of example and not of limitation, suitable screen sizes are 70 mesh (per linear inch) for the magnesia-rich material, and 4 mesh for the olivine. All of the batch or any part of it may be calcined before use, either at temperatures above or below that to which the batch is submitted in service or in firing. Also, the olivine or other constituents of the batch may be pretreated by tabling, magnetic or electrostatic separation, or by other purifying methods to improve their quality by removal of a part or all of objectionable impurities which they may contain.

The batch may be shipped as such, for use as a ramming mix, mortar, or the like, or it may be formed into shapes which may or may not be fired previous to laying up in a furnace structure, all of which broadly contemplate production of shaped articles as the term is used in the appended claims. When shapes, such as brick, are made, the batch is worked up and pressed, or formed, by any suitable procedure and apparatus, the art being familiar with these operations. Advantageously high forming pressures are used.

*Example 1.*—As exemplifying the practice of the invention, reference may be made to brick which were formed from a batch composed of 80 per cent of olivine ground to pass 4 mesh, and 20 per cent of dead-burned magnesite, ground to pass 70 mesh, of the composition identified as "A" in the foregoing table. The olivine was of the following analysis:

| | Percent |
|---|---|
| $SiO_2$ | 40.9 |
| MgO | 48.9 |
| FeO | 7.7 |
| $Al_2O_3$ | 0.7 |
| CaO | 0.2 |
| $Cr_2O_3$ | 0.5 |
| Combined water | 0.6 |

The batch containing about 1.4 per cent of CaO was tempered with water and standard 9 x 4½ x 2 inch brick were pressed from it in a hydraulic press at a pressure of about 4000 pounds per square inch. The brick were dried for about 4 days at between 120° to 300° F. and then were burned to a temperature of about 2700° F. After firing these brick showed a cold-crushing strength on flats of 3500 pounds per square inch. In contrast, brick made from high purity magnesite in accordance with prior proposals tend to crumble easily after firing.

The exact manner of pressing the brick, and the type of press used, may be adapted to the particular use to which the brick are to be put, as will be understood. Also, the brick may be fired at higher or lower temperatures, and the composition of the batch may be varied according to particular requirements as long as the brick contain a preponderant amount of forsterite or forsterite-forming material together with sufficient of a magnesia-rich material of high-lime content to afford conversion of the impurities to highly refractory forms, suitable bonding of the brick, and development of the desired properties, as indicated hereinabove.

The invention is not restricted to the manufacture of brick which are fired prior to being placed in service, but is applicable also to the manufacture of brick and other shapes which are fired after being laid up in the furnace in which they are to be used. In such instances it is desirable to add a temporary binder, of which a variety are available and known in the art.

*Example 2.*—As exemplifying such practice of the invention, brick may be made from a batch containing 80 per cent of olivine of the composition given in Example 1, 20 per cent of dead-burned magnesite of the composition "B" in the foregoing table, these materials being ground as in the preceding example, this batch containing about 5.2 per cent of CaO derived from the magnesite (5.0 per cent) and the olivine (0.2 per cent). To this base mix there is added, as temporary binder, 4 per cent of nitre-cake and 2 per cent of ground kaolin. The formed brick are capable of being shipped without firing; after firing their cold crushing strength is about 5000 pounds per square inch.

As illustrating the progressive increase in strength with increase in lime content, within the limits stated, reference may be made to the following table in which there are presented the results of tests which we have conducted:

| Mix (* olivine+stated magnesite) | CaO in product | Cold crushing strength |
|---|---|---|
| | Percent | Psi |
| No magnesite | 0.2 | 2300 |
| 10% magnesite "A" | 0.8 | 3400 |
| 20% magnesite "A" | 1.4 | 3500 |
| 30% magnesite "A" | 2.0 | 4000 |
| 20% magnesite "B" | 5.0 | 5000 |

* Olivine of composition in Example 1.

As noted above, artificially produced forsterite, or magnesium orthosilicate, may also be used as the base of the refractories. Such material may be made from magnesia and silica in suitable proportions. Or, if desired for any reason, serpentine, talc, soapstone and the like highly serpentinized and steatitized minerals may be used for the same purpose by mixing them with sufficient magnesia to bring their MgO content to about 57 per cent, and heating to a suitable temperature, whereby they are converted to forsterite which may then be treated with high-lime magnesia-rich material in accordance with this invention.

More suitably, however, serpentine and the like hydrosilicate materials are treated directly in accordance with the invention with high-lime magnesia-rich material as just described. As illustrative of this modification reference is made to the following example.

*Example 3.*—The refractories are made from a serpentine having the following analysis:

| | Percent |
|---|---|
| MgO | 37.4 |
| $SiO_2$ | 40.2 |
| $FeO+Fe_2O_3$ | 6.4 |
| $Al_2O_3$ | 1.4 |
| Ignition loss | 14.2 |

The serpentine is calcined to 1450° C., or higher, to remove its shrinkage, and it is then ground to pass a 4-mesh sieve. Magnesite of Composition "A" of the foregoing table is then added in the ratio of 30 parts thereof to 70 parts of the ground calcined serpentine, and the mix is worked up and molded to form brick which are dried at about 250° F. and then burned to approximately 2700° F.

If desired for any reason, the crude serpentine and magnesite are mixed before burning, one advantage being that this procedure avoids pre-calcination of the serpentine, although usually the pre-calcination is desirable because the complete shrinking of the serpentine before adding the magnesia provides products of greater density than where the two materials are mixed before burning.

Although the invention has been described with reference to the manufacture of shaped articles, such as brick, it is applicable equally to the production of refractory compositions suitable for use as ramming mixes for forming portions of furnace structures, as mortars, and the like. For such uses bonding agents and plasticizers, either or both, may be required, as will be understood by those skilled in the art. Other variations may be made without affecting the essence of the invention. For instance, small amounts of mineralizers, or catalysts, may be added to the batch, among which are aluminum phosphate or chloride, fluorides, nitrates, phosphates, borates, alkali metal silicates, and others with which the art is familiar. In general, these mineralizers will be used in amounts from about 0.1 to about 5.0 per cent. Moreover, combinations of magnesia-rich materials high and low in lime may be used provided sufficient lime is added, as stated hereinabove.

Also, there may be added to the batch substantial amounts of other refractory materials, but in such instances the amount of such added material is to be such that the major portion (i. e., 50 per cent or more) of the refractory consists of forsteritic material. As an example of such modified compositions, there may be added chromite between about 10 and 50 per cent of the batch, thus a typical composition would contain about 50 per cent of olivine, 40 per cent of chrome ore, and 10 per cent of a dead-burned magnesite, such as that identified as "B" in the foregoing table.

Other variations are also permissible. For instance, although it is preferred in most instances to use the magnesia-rich material in finely divided condition, yet where there is used an olivine which is exceptionally low in hydrosilicates, and also low in magnesium silicates more siliceous than forsterite (e. g., pyroxenes), it is not so essential that the magnesia-rich material be ground fine relative to the olivine. Under such conditions the function of the magnesia-rich material concerned with converting such olivine impurities to forsterite can be largely dispensed with, hence the magnesia-rich material can be coarser than where the olivine contains larger amounts of the impurities just named.

According to the provisions of the patent statutes, we have explained the principle and mode of practicing our invention, and have described what we now consider to represent its best embodiment. However, we desire to have it understood that, within the scope of the appended claims, the invention may be practiced otherwise than as specifically described.

We claim:

1. That method of making forsterite refractory of improved character which comprises the steps of grinding forsterite material to provide coarse granules, and mixing therewith magnesia-rich material containing from about 3 to about 30 per cent of lime in an amount sufficient to provide at least about 0.8 per cent and not to exceed about 6 per cent of lime.

2. That method of making forsterite refractory of improved character which comprises the steps of grinding forsterite material to provide coarse granules, adding to a major quantity of said forsterite material a magnesia-rich material containing from about 3 to about 30 per cent of lime in an amount sufficient to provide at least about 0.8 per cent and not to exceed about 6 per cent of lime, shaping the batch thus produced, and burning the shaped article.

3. That method of making forsterite refractory of improved character which comprises the steps of grinding forsterite material to provide coarse granules, converting to finely divided form a magnesia-rich material containing from about 3 to about 30 per cent of lime, and adding to said forsterite material an amount of said magnesia-rich material sufficient to provide at least about 0.8 per cent and not to exceed about 6 per cent of lime.

4. That method of making forsterite refractory of improved character which comprises the steps of grinding forsterite material to provide coarse granules, adding to a major quantity of said forsterite material an amount of finely divided magnesia-rich material containing from about 3 to about 30 per cent of lime, sufficient to provide at least about 0.8 per cent and not to exceed about 6 per cent of lime, shaping the batch thus produced, and burning the shaped article.

5. That method of making forsterite refractory of improved character which comprises the steps of grinding olivine material to provide coarse granules, mixing therewith finely divided dead-burned magnesite containing from about 3 to about 30 per cent of lime, to form a batch containing a major amount of olivine and from about 0.8 per cent to about 6 per cent of lime, shaping the batch thus produced, and firing the shaped article.

6. That method of making refractories of improved character from materials containing hydrated magnesium silicate comprising the steps of grinding said silicate to provide relatively coarse granules, adding thereto an amount of a magnesia-rich material containing from about 3 to 30 per cent of lime and in amount sufficient to convert said silicate to magnesium orthosilicate and sufficient to provide at least about 0.8 per cent and not to exceed about 6 per cent of lime, shaping the batch, and firing the shaped article.

7. A method according to claim 6, said silicate being calcined to eliminate shrinkage prior to adding said magnesia-rich material.

8. That method of making forsterite refractory of improved character which comprises the steps of grinding forsterite material to provide coarse granules, adding chrome ore in an amount less than said forsterite material, converting to finely divided form a magnesia-rich material containing from about 3 to about 30 per cent of lime, and adding to the batch an amount of said magnesia-rich material sufficient to provide at least about 0.8 per cent and not to exceed about 6 per cent of lime.

9. A refractory of improved character comprising a major proportion of forsterite material and an amount of magnesia-rich material containing from about 3 to 30 per cent of lime sufficient to provide from about 0.8 per cent to about 6 per cent of lime in the refractory.

10. An unburned refractory comprising more than about 50 per cent of forsterite material, and an amount of magnesia-rich material containing from about 3 to 30 per cent of lime sufficient to provide between about 0.8 per cent and about 6 per cent of lime in the refractory.

11. A burned refractory comprising a major proportion of magnesium orthosilicate and about 0.8 per cent to about 6 per cent of lime.

12. A burned refractory formed from a batch containing more than about 50 per cent of olivine, and magnesite high in lime to provide from about 0.8 per cent to about 6 per cent of lime.

13. A burned refractory comprising more than about 50 per cent of magnesium orthosilicate, from about 10 to about 50 per cent of chrome ore, and about 0.8 per cent to about 6 per cent of lime.

14. A refractory composition of improved character comprising a major proportion of olivine, chrome ore in an amount less than said olivine, and an amount of a magnesia-rich material containing between about 3 to 30 per cent of lime sufficient to provide the refractory with not less than about 0.8 per cent and not to exceed about 6 per cent of lime.

15. A refractory composition of improved character comprising more than about 50 per cent of olivine, chrome ore more than 10 per cent and less than 50 per cent, and an amount of burned magnesite containing between about 3 to 30 per cent of lime sufficient to provide the refractory with from about 0.8 per cent to about 6 per cent of lime.

FREDERIC A. HARVEY.
RAYMOND E. BIRCH.